United States Patent
Menkhoff et al.

(10) Patent No.: US 6,559,897 B2
(45) Date of Patent: May 6, 2003

(54) METHOD FOR RANDOM ACCESS TO PICTURE BLOCKS IN VIDEO PICTURES

(75) Inventors: Andreas Menkhoff, München (DE); Günter Scheffler, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/777,441

(22) Filed: Feb. 6, 2001

(65) Prior Publication Data

US 2001/0017670 A1 Aug. 30, 2001

Related U.S. Application Data

(63) Continuation of application No. PCT/DE99/02447, filed on Aug. 4, 1999.

(30) Foreign Application Priority Data

Aug. 6, 1998 (DE) .......................................... 198 35 607

(51) Int. Cl.⁷ .............................................. H04N 5/907
(52) U.S. Cl. ...................................... 348/718; 348/714
(58) Field of Search ................................. 348/718, 721, 348/719, 714, 720; 365/189.04, 230.03; 382/303, 305, 268; H04N 5/907

(56) References Cited

U.S. PATENT DOCUMENTS

| | | | |
|---|---|---|---|
| 4,550,437 A | * | 10/1985 | Kobayashi et al. |
| 4,683,497 A | | 7/1987 | Mehrgardt |
| 4,922,437 A | | 5/1990 | Sakata et al. |
| 5,596,684 A | * | 1/1997 | Ogletree et al. |
| 5,748,178 A | * | 5/1998 | Drewry |

FOREIGN PATENT DOCUMENTS

| | | |
|---|---|---|
| DE | 41 41 892 A1 | 7/1992 |
| DE | 195 01 560 A1 | 7/1995 |
| EP | 0 587 443 A2 | 3/1994 |
| EP | 0 674 438 A2 | 9/1995 |

* cited by examiner

*Primary Examiner*—David E. Harvey
(74) *Attorney, Agent, or Firm*—Laurence A. Greenberg; Werner H. Stemer; Gregory L. Mayback

(57) ABSTRACT

During image processing of video pictures, it is generally necessary to have fast, repeated access to adjacent picture blocks. Picture memories with a sufficient capacity to store complete video pictures do not have the necessary access time to perform image processing in real time. The invention therefore provides for the writing of picture blocks from a picture memory to a fast access memory. Only the pixels in the access memory are accessed when the image processing operation is performed. During the read-out, a further block from the picture memory is simultaneously read into the access memory. As a result, fast access to the picture data is possible in conjunction with little additional outlay in respect to memory. Areas of application for the method are in the image processing of video pictures.

6 Claims, 2 Drawing Sheets

FIG 3
FIG 3a
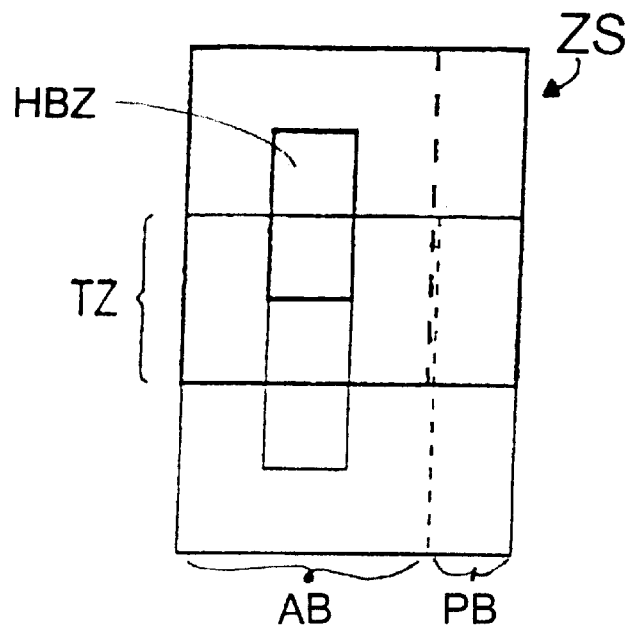
FIG 3b
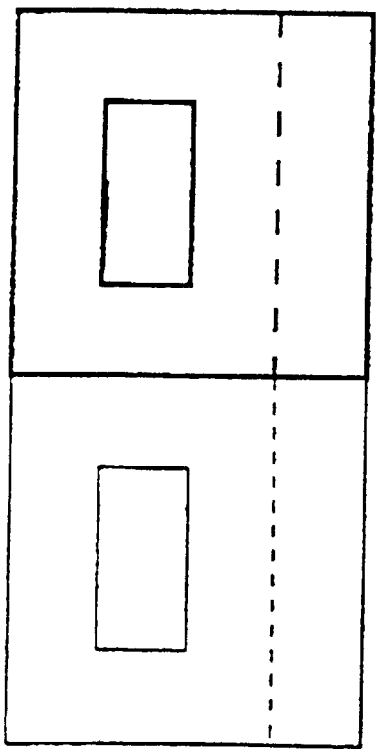

METHOD FOR RANDOM ACCESS TO PICTURE BLOCKS IN VIDEO PICTURES

CROSS-REFERENCE TO RELATED APPLICATION

This application is a continuation of copending International Application No. PCT/DE99/02447, filed Aug. 4, 1999, which designated the United States.

BACKGROUND OF THE INVENTION

Field of the Invention

The invention relates to a method that allows random access to picture blocks in a video picture, for example a television picture.

In image processing, it is often necessary to have recourse to picture areas of contiguous or adjacent pixels in order to subject the areas to a comparison of the picture contents or a filter function. Video pictures are generally composed of a sequence of successive pixels. The data of the pixels are transmitted in such a way that a picture line starts to be built up only when the preceding picture line is completely present. In the case of television pictures transmitted using the line interlacing method, a first line (for example the second line) of a first field is displayed before the second line of this field (in that case the fourth line in the above example) is built up.

The fact that the video picture is built up line by line in this way results in that pixels have to be buffer-stored if pixels of a picture column are intended to be accessed directly in succession or simultaneously. The next pixel with respect to a specific pixel in the vertical direction of the picture is available only after a delay in the case of the sequential data transmission described. In the case of buffer-storage, arbitrary access to picture blocks, that is to say a group of pixels in horizontal and vertical proximity is possible.

Dynamic random access memories (DRAMs) are suitable for buffer-storage since they have a high memory density relative to the chip area. In dynamic semiconductor memories, the memory cells are usually disposed in a plurality of memory array block units. In the event of an access to a specific memory cell, the memory array block unit containing this cell must first be activated. If two pixels which are intended to be accessed virtually simultaneously lie in different memory array block units, then first one unit and then the other must be activated in order to read out the respective pixel. At a high pixel transmission rate, real-time image processing is then not possible. Access to two pixels which are disposed in two different memory array block units is complicated particularly when these pixels have to be multiply accessed for an image processing operation, which is often the case.

SUMMARY OF THE INVENTION

It is accordingly an object of the invention to provide a method for random access to picture blocks in video pictures which overcomes the above-mentioned disadvantages of the prior art methods of this general type, which can be carried out with only little additional outlay in respect of memory.

With the foregoing and other objects in view there is provided, in accordance with the invention, a method for random access to picture blocks in a video picture composed of lines composed of pixels. The method includes the steps of:

storing a first excerpt of a sub-picture in a first area of an access memory, the first excerpt is dimensioned such that it encompasses a main picture block having x pixels in a horizontal direction of the sub-picture and also at least one adjacent picture block adjoining it in the horizontal direction and having equivalent dimensions;

reading out one of the main picture block and the at least one adjacent picture block from the access memory;

storing a portion of the sub-picture which adjoins the first excerpt horizontally in a second area of the access memory while a picture block is being read out, the portion being chosen such that it contains x pixels in the horizontal direction and, in a vertical direction, as many of the pixels as the first excerpt has in the vertical direction; and storing a second excerpt of the sub-picture having equivalent dimensions as the first excerpt in the first area of the access memory, the second excerpt being shifted horizontally relative to the first excerpt such that it completely contains the portion of the sub-picture stored in the second area.

The invention has the advantage that, with the access memory having a small size in relation to the number of pixels in the video picture, image processing, for example of television pictures, is possible in real time. With regard to the access time, more stringent requirements are imposed on the access memory than on the picture memory. On account of the comparatively low capacity of the access memory, the method according to the invention can nevertheless be carried out cost-effectively. Each individual pixel can be accessed within the first area of the access memory.

A further advantage is that the ratio of the data rate at the output of the access memory and that at its input is determined by the size of the main picture blocks. Consequently, the ratio of the data rate to the size of the access memory can be adapted to the given circumstances.

In a preferred embodiment, the second area of the access memory is three times as large as that of the main picture block. The first area of the access memory preferably contains the main picture block and also eight adjacent picture blocks adjoining it and having the same size as the main picture block. Once the image processing has been performed for the main picture block, the adjacent picture block adjoining the right-hand side of the previous main picture block becomes the new main picture block. At the end of the line of the video picture, the new main picture block emerges from the adjacent picture block that adjoins the bottom side of the main picture block with its position at the start of the line. The main picture block typically migrates in the horizontal direction from left to right across the video picture. If the main picture block has reached the end of the video picture, it is offset vertically downward by the height of the main picture block and returned to the left-hand edge of the video picture in this line.

It has proved to be expedient for the access memory to be embodied such that a picture having 48 pixels in the horizontal direction and 24 pixels in the vertical direction can be stored in its first area and a picture having 16 pixels in the horizontal direction and likewise 24 pixels in the vertical direction can be stored in its second area.

Static semiconductor memories (SRAMs) are especially suitable as embodiments of the access memory. They allow short access times. Their large area requirement relative to the memory capacity is of no consequence since only a fraction of the pixels of the video picture is stored in the access memory.

In accordance with an added mode of the invention, there is the step of providing the first excerpt with at least one further adjacent picture block adjoining the main picture block in the vertical direction and having equivalent dimensions as the main picture block. At least some of the pixels are read out from the second excerpt from the access memory. Subsequently, a third excerpt of the sub-picture is stored in the first area of the access memory. The third excerpt being shifted vertically relative to the first excerpt such that the main picture block still lies within the first excerpt.

In accordance with an additional mode of the invention, there is the step of forming the main picture block to be rectangular and the main picture block is surrounded by eight adjoining adjacent picture blocks.

In accordance with another mode of the invention, there is the step of setting the first area of the access memory to have 48 pixels in the horizontal direction and 24 pixels in the vertical direction and the second area is set with 16×24 pixels.

In accordance with a further mode of the invention, there is the step of embodying the access memory as a static random access memory (SPAM).

In accordance with a concomitant feature of the invention, the video picture is a field of a line-interlaced television picture.

Other features which are considered as characteristic for the invention are set forth in the appended claims.

Although the invention is illustrated and described herein as embodied in a method for random access to picture blocks in video pictures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3a–3b show a further illustration for explaining the method according to the invention with a different size of a main picture block.

DESCRIPTION OF THE PREFERRED EMBODIMENTS

Figure 1:
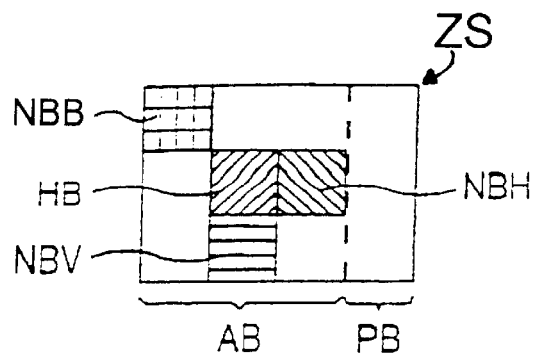
FIG. 1 is an illustration of an organization of an access memory.

The invention is based on a video picture that is composed of lines and is stored completely in a horizontal direction and at least partially in a vertical direction, in a picture memory. The video picture is, for example, a field of a line-interlaced television picture. Such picture memories are usually dynamic random access memories (DRAMs), which can be produced cost-effectively with a high integration level.

What are read from the picture memory, which may be organized from memory array block units, are not individual pixels but entire memory blocks containing a plurality of contiguous pixels. A memory array block unit or a portion thereof is suitable as a memory block.

In all the figures of the drawing, sub-features and integral parts that correspond to one another bear the same reference symbol in each case. Referring now to the figures of the drawing in detail and first, particularly, to FIG. 1 thereof, there is shown an access memory ZS for storing the memory block read from the picture memory. The access memory ZS has a short access time and allows different memory locations to be read in and out at the same time. The pixels stored in the access memory ZS can be accessed individually in order to perform a filter function, for example. The access memory ZS has a further area, into which a next memory block to be processed is read while an image processing operation is performed with the pixels of the memory block already stored. As soon as this image processing operation is concluded, the pixels of a further area of the access memory ZS that have just been read in are available for image processing.

FIG. 1 illustrates the organization of the access memory ZS. The access memory ZS is subdivided into an operating area AB and a buffer area PB. If an image processing operation is to be performed on the video picture, then this is done excerpt by excerpt. A first excerpt is selected, containing for example a top left corner of the video picture. The method provides for the first excerpt to contain a main picture block HB, which is adjoined by at least one adjacent picture block NBH in the horizontal direction of the video picture. The main picture block HB is usually surrounded by adjacent picture blocks NB on all sides and edges.

In FIG. 1, not only the adjacent picture block NBH in the horizontal direction but also an adjacent picture block NBV in a vertical direction and an adjacent picture block NBB, which adjoins the top left edge of the main picture block HB, are emphasized by different hatching in each case. The main picture block HB is surrounded by a total of eight adjacent picture blocks NB in the example according to FIG. 1. The size of the picture blocks HB, NB, that is to say in each case the number of pixels in the horizontal and vertical direction, depends on the nature of the image processing operation.

The method is particularly suitable for determining motion in picture contents. By way of example, if the intention is to determine a motion vector for a rectangular window of a picture in a picture sequence, the size of the main picture block HB is chosen in accordance with the dimensions of the window. The pixels within the window are then compared with the main picture block HB of a subsequent picture in the picture sequence. In this case, the position of the main picture block HB is chosen such that it corresponds to the position of the window. If the pixels of the window correspond to those of the main picture block HB, taking certain tolerances into consideration, there is no motion in the sub-picture determined by the window during the transition from the picture from which the window was chosen to the subsequent picture.

By comparing the pixels of the window with those of the adjacent blocks, it is possible to determine a motion vector for the picture portion for the transition from the picture from which the window was chosen to the picture from which the adjacent picture blocks originate. To that end, a measure of the correspondence of the pixels of the window to those of the respective adjacent picture blocks is determined. A conclusion about the motion of the picture content of the window can be drawn from the position of the adjacent picture block having the greatest correspondence. The size of the adjacent picture blocks NB depends on the average motion that occurs, and is determined empirically.

A portion of the video picture that adjoins the first excerpt is stored in the buffer area PB of the access memory ZS. In the vertical direction, it encompasses as many pixels as the first excerpt has in the vertical direction. In the horizontal direction, it contains just as many pixels as the main picture block HB in this direction.

In a first step of the method, the first excerpt of the video picture is stored in the operating area AB of the access memory ZS. Suppose that the first excerpt corresponds to the top left corner of the video picture. In that case, the adjacent picture block in the diagonal direction NBD lies exactly in the corner of the video picture. If the main picture block HB is intended to lie in this corner, it is not possible to obtain any adjacent picture blocks above and to the left of the main picture block HB from the video picture. In this case and in other cases in which the adjacent picture blocks that are to be taken into consideration lie outside the video picture, an average brightness value is assumed for the pixels of the relevant adjacent picture blocks.

While the pixels of the operating area AB are being accessed in order, for example, to determine motion, the portion of the video picture which adjoins the first excerpt is read into the buffer area PB of the access memory ZS. The number of pixels in the vertical direction in the operating area AB and in the buffer area PB are the same. In the horizontal direction, the number of pixels stored in the buffer area PB is the same as the main picture block HB has in the horizontal direction.

In a second step, a second excerpt of the video picture is stored in the operating area AB, the excerpt emerging from the first excerpt as a result of shifting in the horizontal direction by a width of the main picture block HB and the pixels of-the buffer area PB. If the main and adjacent picture blocks have the same size, then the second excerpt contains two thirds of the pixels of the first excerpt and the pixels of the buffer area PB. In the second excerpt, the adjacent picture block that lay to the right of the main picture block in the first excerpt is now the main picture block. The pixels of the second excerpt can now once again be subjected to an image processing function. At the same time, a picture area of the video picture that adjoins the second excerpt is read into the buffer area PB.

Figure 2A:
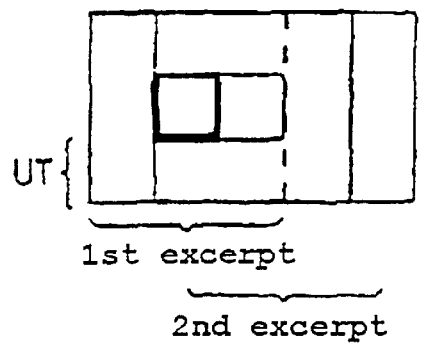
FIGS. 2a–2c are illustrations for explaining the method according to the invention.

FIG. 2a illustrates the horizontal shifting of the second excerpt, illustrated using thin lines, relative to the first excerpt (with thicker lines). The second step is repeated until the main picture block has reached the right-hand edge of the video picture. It is already the case one step before this that no more pixels from the video picture can be read into the buffer area PB since there is no portion of the video picture which adjoins the excerpt then present. In this case, too, it is possible to read average brightness values into the buffer area PB.

Figure 2B:
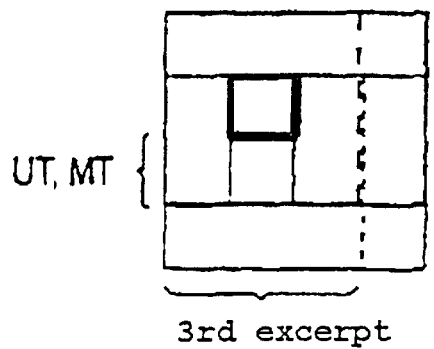
Figure 2C:
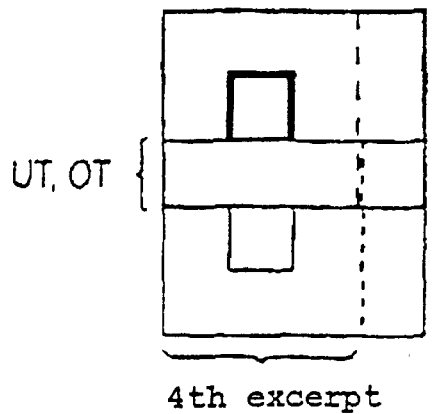

In a third step, a third excerpt of the video picture is read into the operating area AB of the access memory ZS. Relative to the first excerpt, the third excerpt is shifted merely in the vertical direction by as many pixels as the main picture block encompasses in the vertical direction. FIG. 2b again illustrates the first excerpt with thick lines and the third excerpt—shifted with respect to the first excerpt—with thinner lines. A lower portion UT of the first excerpt corresponds to a middle portion MT of the third excerpt. In the case of a fourth excerpt, which is shifted vertically relative to the third excerpt by the number of pixels of the main picture block in the vertical direction, an upper portion TO corresponds to the lower portion UT of the first excerpt. In other words, the pixels belonging to the lower portion UT of the first excerpt are read three times from the picture memory in this example. The ratio of the output data rate to the input data rate of the picture memory is thus three in this case. The fourth excerpt is illustrated in FIG. 2c.

FIGS. 3a–3b shows a further embodiment with a second main picture block HBZ that is larger than in the first embodiment. In this case, the second main picture block HBZ is twice as large in the vertical direction as in the case of the first embodiment. The adjoining adjacent picture blocks in the vertical direction and diagonally have a size as in the case of the first embodiment. Adjacent picture blocks that laterally adjoin the second main picture block HBZ are as large as the second main picture block HBZ. In this exemplary embodiment, the buffer area PB is twice as large as the operating area AB of the access memory ZS. The chosen excerpt at the starting position is shifted downward a first time (FIG. 3a) and a second time (FIG. 3b) in the vertical direction by as many pixels as the second main picture block HBZ has in the vertical direction. A certain portion TZ of the pixels in the operating area AB is read out anew after the shifting process, which is depicted using thin lines in FIG. 3a. In the event of a further shifting process, as is illustrated in FIG. 3b, there is no overlap with the initial excerpt. The ratio of the data rate at the output of the picture memory to the data rate at its input is two in this exemplary embodiment. In this case, too, the data of the pixels are read out from the picture memory at a higher clock rate than they are written to the memory.

We claim:

1. A method for random access to picture blocks in a video picture composed of lines composed of pixels, including reading the picture blocks from a picture memory at least partially storing the video picture and storing the picture blocks in an access memory, which comprises the steps of:

storing a first excerpt of a sub-picture of the video picture in a first area of the access memory, the first excerpt being dimensioned such that it encompasses a main picture block having x pixels in a horizontal direction of the sub-picture and also at least one adjacent picture block adjoining it in the horizontal direction and having equivalent dimensions;

reading out at least some of the pixels of the main picture block and the at least one adjacent picture block from the first area (AB) of the access memory in order to access the pixels read out;

storing a portion of the sub-picture which adjoins the first excerpt horizontally in a second area (PB) of the access memory while the pixels of the main picture block and the at least one adjacent picture block are being read out from the first area (AB) of the access memory, the portion being chosen such that it contains x pixels in the horizontal direction and, in a vertical direction, as many of the pixels as the first excerpt has in the vertical direction; and overwriting the data stored in the first area of the access memory with data from the picture memory and the data of the second area of the access memory as a second excerpt of the sub-picture having equivalent dimensions to the first excerpt, causing the second excerpt to represent a horizontally shifted version of the first excerpt in combination with the complete portion of the sub-picture stored in the second area of the access memory.

2. The method according to claim 1, which comprises:

providing the first excerpt with at least one further adjacent picture block adjoining the main picture block in the vertical direction and having equivalent dimensions as the main picture block;

reading out at least some of the pixels of the second excerpt from the first area (AB) of the access memory in order to access the pixels read out; and subsequently, overwriting the data stored in the first area (AB) with a third excerpt of the sub-picture from the picture memory, the third excerpt being shifted vertically relative to the first excerpt by as many pixels as the main picture block encompasses in the vertical direction causing the third excerpt to represent a vertically shifted version of the first excerpt.

3. The method according to claim 1, which comprises forming the main picture block to be rectangular and the main picture block is surrounded by eight adjoining adjacent picture blocks.

4. The method according to claim 1, which comprises setting the first area of the access memory to have 48 pixels in the horizontal direction and 24 pixels in the vertical direction and the second area is set with 16×24 pixels.

5. The method according to claim 1, which comprises embodying the access memory as a static random access memory (SRAM).

6. The method according to claim 1, wherein the video picture is a field of a line-interlaced television picture.

* * * * *